Dec. 10, 1968  J. L. LEISTRA  3,416,037
DEVICE FOR CHECKING DEVIATIONS IN THE THICKNESS OR MASS
OF TEXTILE THREADS
Filed March 24, 1965

INVENTOR.
JOHANNES L. LEISTRA
BY
Frank R. Dufair
AGENT

United States Patent Office 3,416,037
Patented Dec. 10, 1968

3,416,037
DEVICE FOR CHECKING DEVIATIONS IN THE THICKNESS OR MASS OF TEXTILE THREADS
Johannes Libbe Leistra, Enschede, Netherlands, assignor to North American Philips Company, Inc., New York, N.Y., a corporation of Delaware
Filed Mar. 24, 1965, Ser. No. 442,297
Claims priority, application Netherlands, Mar. 25, 1964, 6403165
10 Claims. (Cl. 317—123)

ABSTRACT OF THE DISCLOSURE

A yarn testing system that includes an amplifier having a radiant energy emitting element in its output circuit and a voltage divider in its input circuit. The voltage divider includes an impedance element that responds to the energy emitting element. These elements are arranged to operate with a time delay so that the amplifier output voltage remains constant for slow variations of the input signal produced by gradual variations in the yarn size, moisture content, or the like. A rapid variation in the input signal produced by a slub produces a large change in the output voltage, which can be used to perform a yarn control function.

---

This invention relates to devices for checking deviations in the thickness or mass of textile threads. In these devices, the deviations are converted into an electric voltage and those variations exceeding a predetermined limit actuate a relay device which holds and cuts the thread, or which detects the relevant variations or actuates a counter.

Such a device is known from Dutch patent specification No. 97,402. In this device a thyratron operating as a relay valve acquires, in addition to an adjustable negative bias, a negative bias obtained by rectification and smoothing of the voltage occurring due to the normal deviations in the diameter or mass of the thread from a mean value. Both biasing potentials act in the cutoff direction on the thyratron which breaks down only if a positive pulse caused by a given undue irregularity of the thread sets up at the grid a positive potential exceeding the sum of the negative biases.

The first-mentioned electric voltage, the thread signal, may be obtained in known manner by optical or capacitive means, as shown for instance in Dutch patent specification 100,045 or 97,402, respectively.

An object of the known device is to render its operation to a certain extent independent of the thickness of thread so that a variation in the thread number or thread size does not invariably require a new adjustment to be made.

The operation of the known device is reasonable only over a fairly limited range of the thread signal. In practice, however, the signal may vary by more than a factor of 20 and it will often be necessary to reckon with a factor of 100. The proportioning of the known circuit in this case causes great difficulty.

The present invention provides a device in which a wide range of thread sizes can be accommodated with few or no readjustments required for each change in thread size.

The invention consists in that an amplifier is provided which amplifies the electric voltage. A control magnitude is derived from the amplified voltage to control the amplification with such a delay that the output is maintained substantially constant irrespective of the amplitude of said electric voltage, and increases only upon the occurrence of unwanted irregularities in the thread of a value at which the relay device responds.

With the device according to the invention it is possible to achieve that the output signal for actuating the relay varies by not more than 10% with a range of the input thread signal from 1 to 1000.

The magnitude of the electric alternating voltage, the thread signal, depends upon the fibrous structure of the kind of thread, upon the thickness and, in the case of a capacitive slub detector, also upon the humidity of the thread. When an impurity passes, a so-called slub, the thread signal increases with a jump so that the amplitude control referred to cannot become active and the voltage on the relay device can increase to the value at which this device responds.

The smallest slub which it is still desired to detect approximately corresponds (in mass per cm. length) to double the mean mass of thread. Normal slubs lie between 3-fold and 10-fold of the mean mass.

With capacitive slub detectors, 1 mg. of water has the same influence as have 40 mgs. of cotton. If the thread is well-conditioned, and hence the moisture divided regularly, the presence of water in the thread is not interfering. If the distribution is irregular, for example, if water drops have come down on the thread, a moist spot is seen as a slub and unnecessary rupture occurs in situ.

If the moisture content varies slowly with time, for example, in the course of a day, the slub detector apparently becomes more sensitive or more insensitive and in prior devices correction of the adjustment of the equipment is required. These disadvantages have been the principal reasons leading to the development of the optical cleaner, which otherwise has other disadvantages.

A majority of optical cleaners operate so that the thread signal is amplified to a suitable value, for example, 5 volts from peak to peak and is then applied to the input of the relay circuit which is adjusted, for example, so that a cutting mechanism is operated when a peak to peak value of 15 volts is exceeded. The amplification is then constant and the threshold voltage is controlled at will as a function of the size of slub, the kind of thread, the thickness of thread and the humidity. The disadvantage that the adjustment has in each case to be changed is completely avoided in the device according to the invention.

The time delay of the amplification must be comparatively long and therefore use may advantageously be made of very slow controls based on thermal action or photoelectric conduction. The output voltage and/or the input voltage may then be derived from a voltage divider one resistor of which is controlled as a function of the amplified voltage since the relevant resistor is one having a high temperature coefficient or a photoelectric resistor.

In order that the invention may be readily carried into effect, it will now be described in detail, by way of example, with reference to the accompanying diagrammatic drawing, in which.

Figure 1:
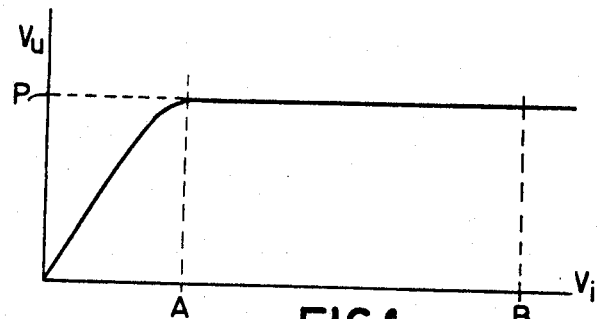
FIGURE 1 shows a characteristic curve of an amplifier for use in a device according to the invention.

In the static characteristic curve of the amplifier shown in FIGURE 1, it has been assumed that the input voltage $V_i$, i.e., the thread signal, lies at A for the thinnest thread and at B for the thickest thread. Between the values A and B of $V_i$ the amplifier provides a constant output signal P. The threshold voltage of the relay device can be adjusted, independently of the kind of thread, to the desired cleaning factor which depends upon the voltage at which the device has to be responsive and which is from the 2-fold to 10-fold of voltage P. The influence of slow variations in thickness and moisture is thus eliminated.

Figure 2:
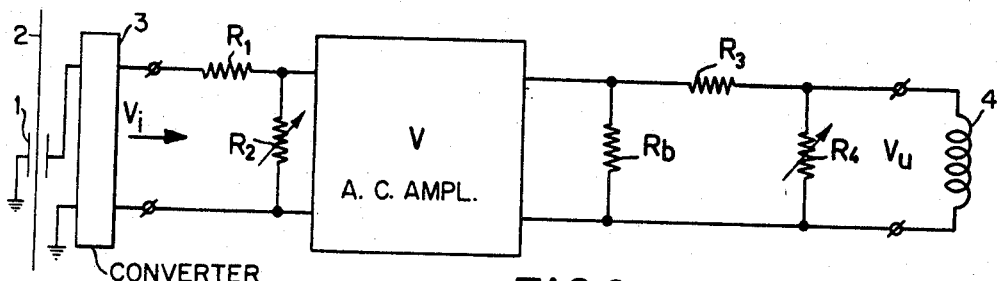
FIGURE 2 shows one embodiment of such an amplifier.

FIGURE 2 shows one embodiment of a device according to the invention. Voltage dividers are provided at the input and the output of an amplifier V. The first voltage divider is constituted by the series-combination of two resistors $R_1$ and $R_2$ and the second by the series-combination of two resistors $R_3$ and $R_4$. The resistors $R_2$ and $R_4$ are either NTC resistors or cadmium-sulphide cells. The load $R_b$ of the amplifier is then either a heating wire heating the resistors of negative temperature coefficient, or a small lamp illuminating the photoelectric resistors. The voltage $V_i$ may be provided in known manner by a capacitive or optical slub detector. A capacitive slub detector is diagrammatically illustrated in FIG. 2. The slub detector includes a measuring capacitor 1 through which the thread 2 passes. The measuring capacitor is connected to a well known converter 3 which generates an electric signal $V_i$ at its output terminals that varies in accordance with the diameter of the thread. The amplifier V is an alternating-voltage amplifier, for instance a customary tube or transistor amplifier. The load $R_b$ causes the output signal $V_u$ to exhibit, as a function of slow variations in the output signal $V_i$, the waveform of FIGURE 1. Due to thermal inertia, rapid variations in this input signal, such as occur upon passage of a slub, will not immediately cause a corresponding variation in the heat or light transmission from the load $R_b$ to the resistors $R_2$ and $R_4$ so that the output voltage $V_u$ exhibits a pronounced variation. The output voltage $V_u$ may be applied to the winding 4 of a control relay. The contacts of the control relay are not shown since they may be connected in any well known manner to energize a cutting mechanism whenever a slub is detected by the system.

A further advantage of the device is that the influence of mutual difference of the slub detectors is eliminated since all the signals from the slub detectors are amplified to the same value. It is therefore necessary only to make the condition that the operation is linear, which condition may readily be fulfilled.

Once the device is operating and the delayed control has brought the amplification to the correct value, the system keeps operating in the normal way until an impermissible irregularity appears which results in the cutting mechanism becoming operative. After a certain time necessary to tie the thread, the amplification has increased to a very high value. If the wire were now laid in the slub detector and no further steps were taken, this would give rise to the appearance of a pulse which would again make the cutting mechanism operative. In one advantageous further embodiment of the device, this may be prevented by making the amplifier oscillate during the period in which no thread signal is present. For this purpose it is possible to provide a feedback coupling including a frequency-determining element, for example, an LC circuit, the voltage produced adjusting itself in the flat portion of the control characteristic. As soon as the thread signal appears again the feedback coupling has to be interrupted so that the circuit again acts as an amplifier.

Figure 3:
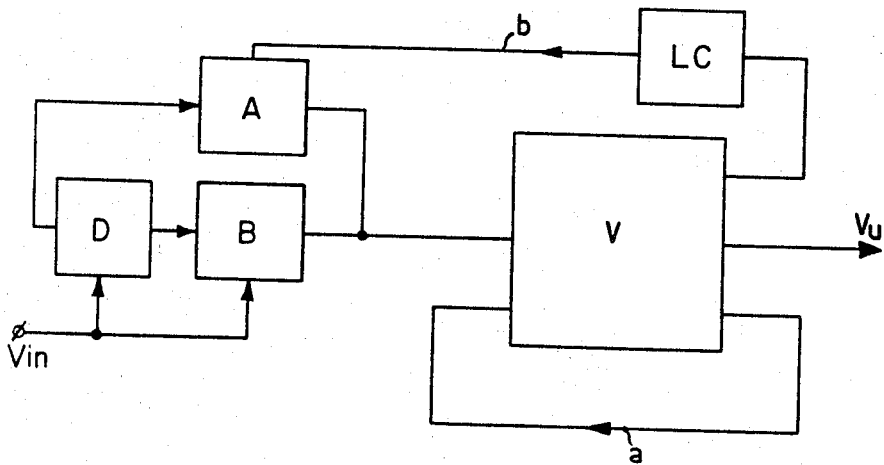
FIGURE 3 is a variant of FIGURE 2.

The device is then of the kind shown in FIGURE 3. The input signal $V_i$ is fed to the input of a trigger circuit D. The trigger circuit has two outputs connected to the control inputs of gate circuits A and B. In the absence of the thread signal $V_i$, the trigger circuit operates to close gate B against transmission and to open gate A for transmission. The trigger may be of the Schmitt trigger type which triggers at a predetermined input voltage level which is lower than that of the smallest signal $V_i$ to which the device is to respond. The amplifier V comprises a control loop *a* effecting delayed automatic gain control which may be of the type described with reference to FIG. 2. Since stage A is conductive, a positive feedback coupling loop *b* is closed between the output and the input of amplifier V. The feedback loop *b* includes a frequency tuned circuit LC. Amplifier V and feedback loop *b* combine to form an oscillator that generates the sustained oscillations, the amplitude of which is controlled by loop *a*. As soon as the thread signal exceeds a predetermined lower limit, the trigger circuit changes state so that gate A closes against transmission and gate B is opened for transmission. In this case the connection between feedback loop *b* and the input of amplifier V is interrupted. Instead the input of amplifier V is now connected to the source of thread signal $V_i$ via gate B. Since this thread signal is usually smaller than the amplitude of the oscillations produced previously, a sudden decrease of the output voltage $V_u$ may be effected at the outset. However, the cutting mechanism does not respond thereto.

Instead of making the amplifier V itself oscillate, it would be possible, in the absence of the thread signal, to switch the input of the amplifier to an auxiliary voltage externally, but this solution is more expensive.

What is claimed is:

1. A yarn testing system comprising means for generating an electric signal that varies in accordance with the diameter of the yarn, first and second input terminals for receiving said electric signal and third and fourth output terminals for deriving a control voltage, an amplifier having input and output terminals, a voltage divider interconnecting said first and second terminals with said amplifier input terminals and including first and second impedance elements, one of said impedance elements exhibiting an impedance that varies as a function of radiant energy impinged thereon, radiant energy emitting means connected to said amplifier output terminals and located so that said one impedance element is responsive to the radiant energy emitted, said energy emitting means being responsive to the amplifier output signal so as to emit radiant energy that varies as a function thereof, means for coupling said third and fourth output terminals to said amplifier output terminals, said emitting means and said one impedance element being operative with a given time delay to vary the amplifier gain so as to maintain said control voltage constant for slow variations in the amplitude of said electric signal while producing a substantial variation in said control voltage in the case of a rapid variation in the amplitude of said electric signal caused by an irregularity in said yarn, and control means connected across said third and fourth output terminals for performing a yarn control function.

2. A system as described in claim 1 wherein said coupling means comprises a second voltage divider including third and fourth impedance elements, said third impedance element exhibiting an impedance that varies as a function of radiant energy impinged thereon and positioned to be responsive to the energy emitted by said radiant energy means.

3. A system as described in claim 2 wherein said first impedance element is connected across the amplifier input terminals and the other one of said first and second impedance elements is connected in series therewith between said one input terminal and one input terminal of said amplifier, said third and fourth impedance elements being connected in series across said amplifier output terminals with said third and fourth output terminals connected across said third impedance element.

4. A system as described in claim 3 wherein said one impedance element and said third impedance element each comprise a thermosensitive resistor having a negative temperature coefficient and said energy emitting means comprises a heating wire.

5. A system as described in claim 3 wherein said one impedance element and said third impedance element each comprise a photosensitive resistor and said energy emitting means comprises a light source.

6. A sytem as described in claim 1 wherein said first and second impedance elements are connected in series across said first and second input terminals and said amplifier input terminals are connected across said one impedance element.

7. A system as described in claim 6 wherein said one impedance element comprises a thermosensitive resistor havng a negative temperature coefficient and said energy emitting means comprises a heating wire.

8. A system as described in claim 6 wherein said one impedance element comprises a photosensitive resistor and said energy emitting means comprises a light source.

9. A yarn testing system comprising means for generating an electric signal that varies in accordance with the diameter of the yarn, an input terminal for receiving said electric signal, an amplifier having input and output terminals, control means connected to said output terminals for performing a yarn control function, gating means having first and second inputs and an output, means for coupling said input terminal to said first input of the gating means, a feedback loop coupling the amplifier output to said second input of the gating means, an attenuating network interconnecting said output of said gating means with said amplifier input terminals and including first and second impedance elements, one of said impedance elements exhibiting an impedance that varies as a function of radiant energy impinged thereon, radiant energy emitting means connected to said amplifier output terminals and located so that said one impedance element is responsive to the radiant energy emitted, said energy emitting means being responsive to the amplifier output signal so as to emit radiant energy that varies in a sense to control said one impedance element to vary the amplifier gain so as to maintain the output voltage constant, said gating means being responsive to said electric signal for selectively interconnecting said first and second inputs with said gating means output as a function of the amplitude of said electric signal, the interconnection of said second input and said gating means output being operative to cause said amplifier to oscillate via said feedback loop, said emitting means and said one impedance element having a relatively slow response time.

10. A yarn testing system comprising means for generating an electric signal that varies in accordance with the diameter of the yarn, an amplifier having input and output terminals, an attenuating network having input terminals coupled to said signal generating means and output termnals connected to said amplifier input terminals, said network including first and second impedance elements, one of said impedance elements exhibiting an impedance that varies as a function of radiant energy impinged thereon, radiant energy emitting means connected to said amplifier output terminals and located so that said one impedance element is responsive to the radiant energy emitted, said energy emitting means being responsive to the amplifier output signal so as to emit radiant energy that varies in a sense to control said one impedance element to vary the amplifier gain so as to maintain the output voltage constant, said emitting means and said one impedance element having a relatively slow response time, and control means connected across said amplifer output terminals for operating a yarn cutting device.

References Cited

UNITED STATES PATENTS

| 2,565,500 | 8/1951 | Ingham | 28—64 |
| 2,572,108 | 10/1951 | Chalhoub | 330—143 |
| 3,258,707 | 6/1966 | Lawrence | 330—59 |
| 3,283,135 | 11/1966 | Sklaroff. | |
| 3,043,991 | 7/1962 | Schneider et al. | 317—123 |

FOREIGN PATENTS 1,069,690  11/1959  Germany.

LEE T. HIX, *Primary Examiner.*

U.S. Cl. X.R.

317—149; 330—143, 144